(12) United States Patent
Eriksson

(10) Patent No.: US 8,996,703 B2
(45) Date of Patent: Mar. 31, 2015

(54) REFRESH REQUESTS IN SOFT-STATE SIGNALLING

(75) Inventor: Anders Eriksson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 155 days.

(21) Appl. No.: 13/130,848

(22) PCT Filed: Nov. 25, 2008

(86) PCT No.: PCT/SE2008/051345
§ 371 (c)(1),
(2), (4) Date: May 24, 2011

(87) PCT Pub. No.: WO2010/062226
PCT Pub. Date: Jun. 3, 2010

(65) Prior Publication Data
US 2011/0264808 A1    Oct. 27, 2011

(51) Int. Cl.
H04L 29/08    (2006.01)
H04W 52/02    (2009.01)
H04W 56/00    (2009.01)
(Continued)

(52) U.S. Cl.
CPC ....... *H04W 52/0216* (2013.01); *G06F 13/1689* (2013.01); *H04L 67/145* (2013.01); *H04W 56/00* (2013.01); *H04W 52/0219* (2013.01); *H04W 52/0248* (2013.01); *H04L 69/28* (2013.01); *Y02B 60/50* (2013.01)
USPC ........................................................ 709/227

(58) Field of Classification Search
CPC .......................... H04L 67/145; G06F 13/1689
USPC .................. 709/227–229, 248; 370/503–522
See application file for complete search history.

(56) References Cited

U.S. PATENT DOCUMENTS

| | | | |
|---|---|---|---|
| 7,778,623 B2 | 8/2010 | Araki et al. | |
| 2004/0264381 A1 | 12/2004 | Banerjee et al. | |

(Continued)

FOREIGN PATENT DOCUMENTS

| | | | |
|---|---|---|---|
| JP | 2005080193 A | 3/2005 | |
| JP | 2007037014 A | 2/2007 | |

(Continued)

OTHER PUBLICATIONS

Williams, M. G. et al. "Power Save Topics for Mobile Battery Powered Wireless Devices." IEEE 802.21 Media Independent Handover, Presented at IEEE 802.21 session #27 in Denver, CO, USA, Jul. 15, 2008.

(Continued)

*Primary Examiner* — Un C Cho
*Assistant Examiner* — Fangyan Deng
(74) *Attorney, Agent, or Firm* — Coats and Bennett, PLLC

(57) ABSTRACT

A power-saving synchronization of refresh requesting messages transmitted from a client terminal (31) to different server terminals (33a, 33b) in multiple soft-state dialogues, e.g. in SIP. The synchronization involves a continuous detection of a large time offset (34) occurring between the refresh requesting messages in the different dialogues, and an adjustment of the negotiated length of the refresh interval indicated in the refresh requesting messages, such that the client terminal will transmit the refresh requesting messages approximately simultaneously to the different server terminals.

23 Claims, 7 Drawing Sheets

(51) Int. Cl.
*H04L 29/06* (2006.01)
*G06F 13/16* (2006.01)

(56) References Cited

U.S. PATENT DOCUMENTS

| | | | |
|---|---|---|---|
| 2007/0274221 A1* | 11/2007 | Lee et al. | 370/238 |
| 2008/0045277 A1 | 2/2008 | Plestid et al. | |
| 2008/0062957 A1 | 3/2008 | Narasimha et al. | |
| 2008/0086566 A1* | 4/2008 | Kumarasamy et al. | 709/227 |
| 2008/0154913 A1* | 6/2008 | Kohonen | 707/10 |
| 2009/0177779 A1* | 7/2009 | DeVal et al. | 709/227 |
| 2009/0319670 A1 | 12/2009 | Kang | |

FOREIGN PATENT DOCUMENTS

| | | |
|---|---|---|
| JP | 2007235197 A | 9/2007 |
| JP | 2011525744 A | 9/2011 |

OTHER PUBLICATIONS

Kant, K. "Towards a Virtualized Data Center Transport Protocol." IEEE Conference on Computer Communications Workshops, IEEE, Piscataway, NH, USA, Apr. 13, 2008.

Donovan, S. et al. "Session Timers in the Session Initiation Protocol (SIP)." IETF Network Working Group, Request for Comments: 4028, Category: Standards Track, Apr. 2005.

\* cited by examiner

REFRESH REQUESTS IN SOFT-STATE SIGNALLING

TECHNICAL FIELD

The invention relates to a method and a device for synchronizing the refresh request messages transmitted from a client terminal to different server terminals during soft-state signalling, as well as to a client terminal and a SIP B2BUA comprising such a device.

BACKGROUND

The signalling is an important component in all telecommunication networks, and a conventional signalling protocol may use a hard-state signalling approach, a soft-state signalling approach, or a combination of soft-state and hard-state signalling.

In soft-state signalling, a session will be ended by a time-out, unless the state is refreshed by a refresh requesting message received before the expiry of a negotiated refresh interval. Refresh requesting messages are normally transmitted periodically after an initial installation of a state, indicating that the dialogue should be kept alive. Thus, soft state signalling does not require any explicit removal of a state, nor any reliable signalling, since the server state is automatically removed in case of lost signalling due to e.g. network errors.

In hard-state signalling, on the contrary, an installed state will remain installed, unless explicitly removed by a message transmitted by the client terminal. Since installation and removal of a state is only performed once, a reliable signalling is required.

The SIP (Session Initiating Protocol) conventionally uses a soft state signalling, in which two communicating terminals, i.e. SIP User Agents, maintain a session by continuously refreshing the state of the session. A SIP User Agent acting as a service requesting device, e.g. a client terminal, is called a UAC (User Agent Client), and a SIP User Agent responding to a request for a service, e.g. a server terminal, is called a UAS (User Agent Server). A client terminal may be distributed between different implementation devices, each device hosting a UAC.

In a session initiating requesting message from a client terminal for initiating a SIP dialogue between the client terminal and a server terminal, as well as in the session refresh requesting messages from the client terminal for refreshing the SIP dialogue, the client terminal (UAC, User Agent Client) proposes a suitable, large, value of the refresh interval, e.g. 1800 seconds, in a Session-Expires attribute attached to a header in the refresh requesting message. The server terminal (UAS, User Agent Server) has an option to negotiate the proposed value of the refresh interval by returning a reduced value in a response. However, before the expiration of the refresh interval indicated by the Session-Expires, a subsequent refresh requesting message must be received by the server terminal, otherwise the dialogue will be terminated.

Thus, a soft state SIP-dialogue is maintained by a periodic refresh within a negotiated refresh interval set in the Session-Expires of a session initiation requesting message and the consecutive session refresh requesting messages. However, if a client terminal is maintaining dialogues with multiple server terminals simultaneously over the same radio link, this refresh traffic will be power consuming, and eventually drain the battery. The marginal cost, in terms of energy, to send an IP packet over the radio interface depends on the pre-transmission state of the terminal and its radio equipment. When a client terminal and the radio equipment is in a low-power mode, or powered off, the marginal cost to send an IP-packet will be high, due to the transitioning of the equipment into an operational state, but the cost to send the consecutive IP-packets will be low.

The energy consumption in a client terminal caused by the refresh requests during a typical SIP dialogue with a server terminal is illustrated in the Energy vs Time-diagram in FIG. 1, in which refresh requesting messages, indicated by 1a, 1b and 1c are transmitted on the time instances t0, t1, and t2, respectively. The illustrated refresh intervals t1-t0 and t2-t1 are approximately equal, which results in a repeating pattern of session refresh requesting messages.

FIG. 2 illustrates the energy consumption in a client terminal maintaining multiple SIP-dialogues, SIP-Dialogue 1 and SIP-Dialogue 2, with two server terminals simultaneously. Typically, a client terminal will propose the same, large, refresh interval in the refresh requesting messages to the different server terminal. As illustrated in the figure, a client terminal is likely to be in a high-energy consumption state when maintaining multiple SIP-dialogues, since each refresh request may require a transition from power-off or a low power mode into an operational state.

Energy is also consumed when the terminal is down-powered, during the time interval when the terminal is unable to send, but before power-off, as well as during the high-power interval between the last transmission and the initiation of the power-off sequence.

Since a multi-dialogue scenario is common e.g. in SIP-based IMS (IP Multimedia Subsystem) services, such as registration, presence, and voice services, an IMS client terminal may have a high energy consumption, which will drain the battery quickly.

Related art within this technical field is described e.g. in NOKIA: "Power Save Topics for mobile Battery Powered Wireless Devices", 21 Aug. 2001, which mentions, on page 4, that application require keep-alives from the terminal, and on page 9 that the timers could be configured to be synchronized, as well as in Kant: "Towards a Virtualized Data Center Transport Protocol", which mentions a coordination among multiple device, e.g. by a delay of a transmission of a burst.

SUMMARY

The object of the invention is to address the problem outlined above, and this object and others are achieved by the method and the device according to the appended independent claims, and by the embodiments according to the dependent claims.

According to one aspect, the invention provides a method of synchronizing refresh requesting messages transmitted from a client terminal in multiple simultaneous soft-state dialogues. In the method, a synchronizing device continuously detects the occurrence of a time offset, larger than a threshold value, between the refresh requesting messages in the different dialogues, and performs the following steps when a time offset is detected:

Reduces a refresh interval indicated in the later of the refresh requesting messages by said detected time offset;

Compares the length of the refresh intervals indicated in the refresh requesting messages in the different dialogues, and reduces a longer refresh interval to correspond to a shorter refresh interval, or to a multiple of the length of the shorter refresh interval, if the refresh intervals have different lengths.

Said refresh requesting messages transmitted from the client terminal may comprise session initiation requesting messages and session refresh requesting messages, and the synchronizing device may determine the size of the threshold value.

The reduction of the refresh interval indicated in the later of the refresh requesting messages may be performed in only one refresh requesting message, or divided over two or more refresh requesting messages.

The synchronizing device may be located in the client terminal, or co-located with a SIP B2BUA, through which the refresh traffic is passing, and the SIP B2BUA may be a border gateway.

The dialogues may be SIP dialogues and the terminals SIP User Agents, and the client terminal may be distributed between more than one implementation device, each device hosting a SIP User Agent Client.

Further, the refresh interval in a refresh requesting message may be indicated by a Session-Expires attribute attached to a header, and the method may be adapted to save power in a client terminal maintaining multiple simultaneous soft-state dialogues.

According to a second aspect, the invention provides a synchronizing device arranged to synchronize refresh requesting messages transmitted from a client terminal in multiple soft-state dialogues. The synchronizing device comprises the following means:

means for continuously detecting an occurrence of a time offset larger than a threshold value between refresh requesting messages transmitted in the different dialogues;

means for reducing the refresh interval in the later of the refresh requesting messages by a detected time offset;

means for comparing the length of the refresh intervals in the different dialogues, and means for reducing a longer refresh interval to correspond to a shorter refresh interval, or to a multiple of the length of the shorter refresh interval, if the refresh intervals have different lengths.

The synchronizing device may further comprise means for determining the size of the threshold value.

According to further aspects, the invention provides a client terminal, as well as a SIP B2BUA, comprising a synchronizing device according to the second aspect, and the client terminal may be arranged to correlate the refresh requesting messages with other traffic, by transmitting a scheduled refresh requesting message immediately after the transmission of other traffic, before the expiration of the refresh interval.

The invention according to the above aspects enables power savings in a client terminal maintaining several simultaneous dialogues, which is advantageous e.g. in IMS, since an IMS client terminal often maintains multiple dialogues.

BRIEF DESCRIPTION OF THE DRAWINGS

The invention will now be described in more detail, and with reference to the accompanying drawings, in which.

DETAILED DESCRIPTION

In the following description, specific details are set forth, such as a particular architecture and sequences of steps in order to provide a thorough understanding of the invention. However, it is apparent to a person skilled in the art that the invention may be practiced in other embodiments that may depart from these specific details.

Moreover, it is apparent that the described functions may be implemented using software functioning in conjunction with a programmed microprocessor or a general purpose computer, and/or using an application-specific integrated circuit. Where the invention is described in the form of a method, the invention may also be embodied in a computer program product, as well as in a system comprising a computer processor and a memory, wherein the memory in encoded with one or more programs that may perform the described functions.

One or more embodiments herein save power in a client terminal maintaining multiple dialogues with two or more server terminals, by coalescing the transmission of the refresh requesting messages in time, i.e. synchronizing the refresh requesting messages, such as the session initiation requesting messages and the session refresh requesting messages transmitted to different server terminals, since the power required to send an IP packet over the radio interface is higher if the terminal is in a low power mode, or power off.

Figure 1:
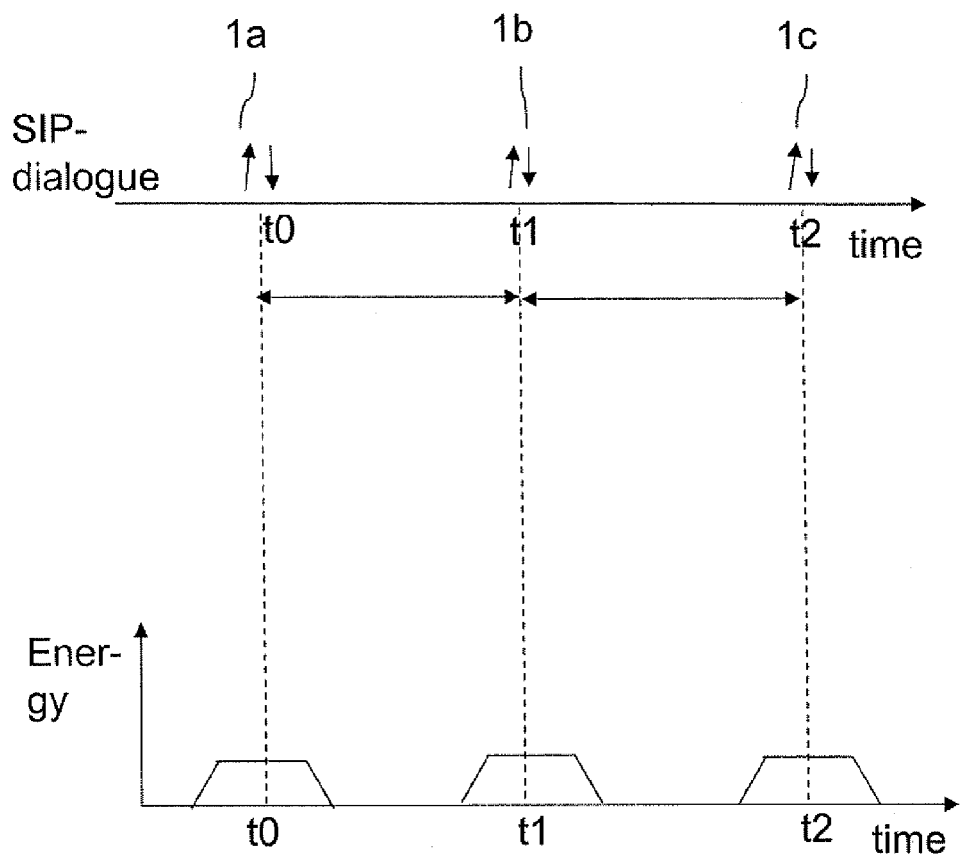
FIG. 1 illustrates the energy consumption of refresh request in one SIP-dialogue.
Figure 2:
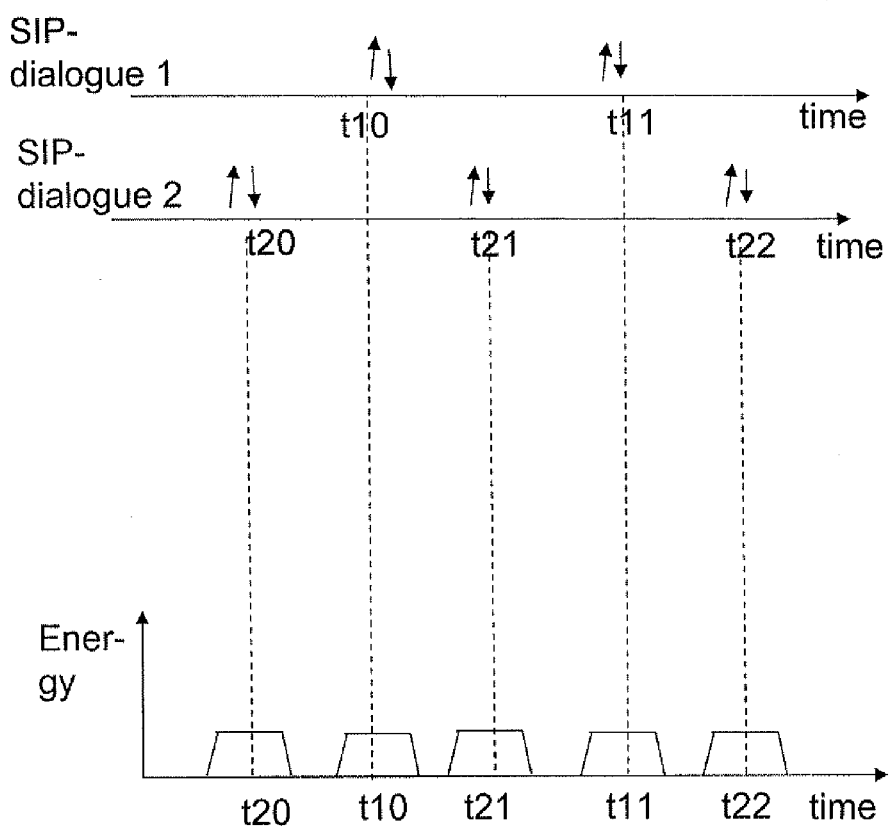
FIG. 2 illustrates the energy consumption of refresh requests of two unsynchronized SIP-dialogues.
Figure 3:
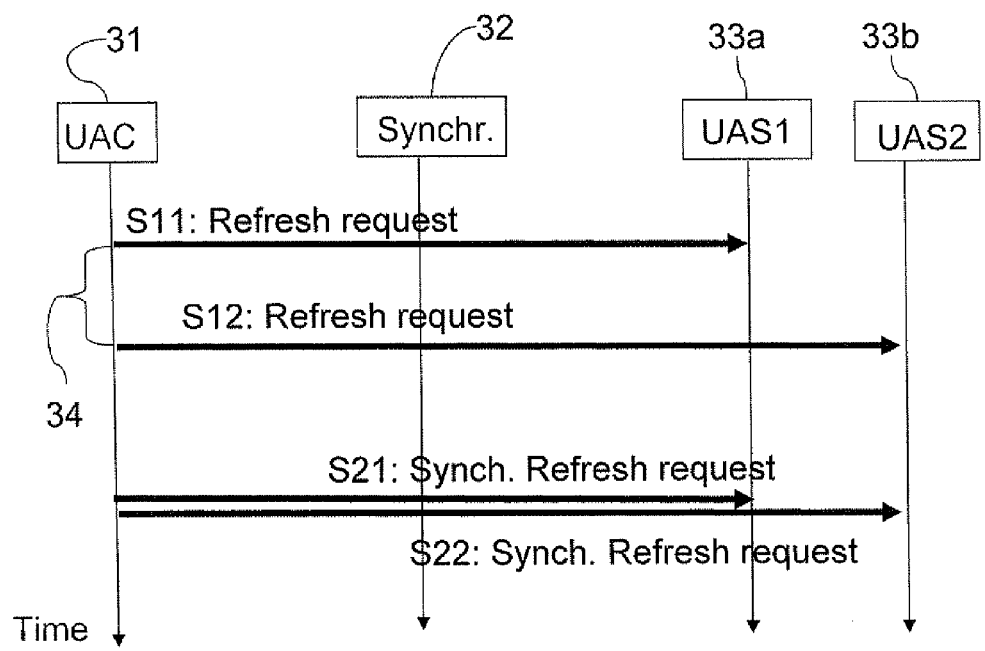
FIG. 3 is signalling diagram illustrating the transmission of refresh requests between one SIP User Agent Client and two SIP User Agent Servers

This synchronization of the refresh requesting messages transmitted from a client terminal is accomplished by an adjustment of the negotiated value of the refresh interval indicated in a session initiation requesting message and in the consecutive session refresh requesting messages, such that a client terminal maintaining multiple dialogues will transmit the refresh requests to the different server terminals approximately simultaneously, which is illustrated in the signalling diagram in FIG. 3.

FIG. 3 is a signalling diagram illustrating a client terminal 31, e.g. one SIP User Agent Client, UAC, maintaining SIP dialogues with two server terminals 33a, 33b, i.e. two SIP User Agent Servers, UAS1 and UAS2, the time indicated on the vertical axis. The signal S11 is a refresh requesting message transmitted from the client terminal 31 to the first server terminal 33a, i.e. to UAS1, and the signal S12 is a refresh requesting message transmitted from the client terminal 31 to the second server terminal 33b, i.e. to UAS2. The signals S11 and S12 are not synchronized, and there is a time offset 34 between them, since they are not transmitted simultaneously. According to this invention, a synchronizing device 32 will detect the time offset 34, and perform a synchronization of the refresh requesting messages transmitted from the client terminal to the two server terminals. After the synchronization, the refresh requesting messages from the client terminal to the two server terminals will be transmitted approximately simultaneously, as illustrated by the signals S21 and S22 in the figure. The synchronizing device 32 is located in the path of the requesting messages to be synchronized, either on the network side or in the client terminal.

A client terminal 31 may alternatively be distributed between more than one SIP User Agent Client, each UAC located e.g. in a separate personal computer.

Figure 4:
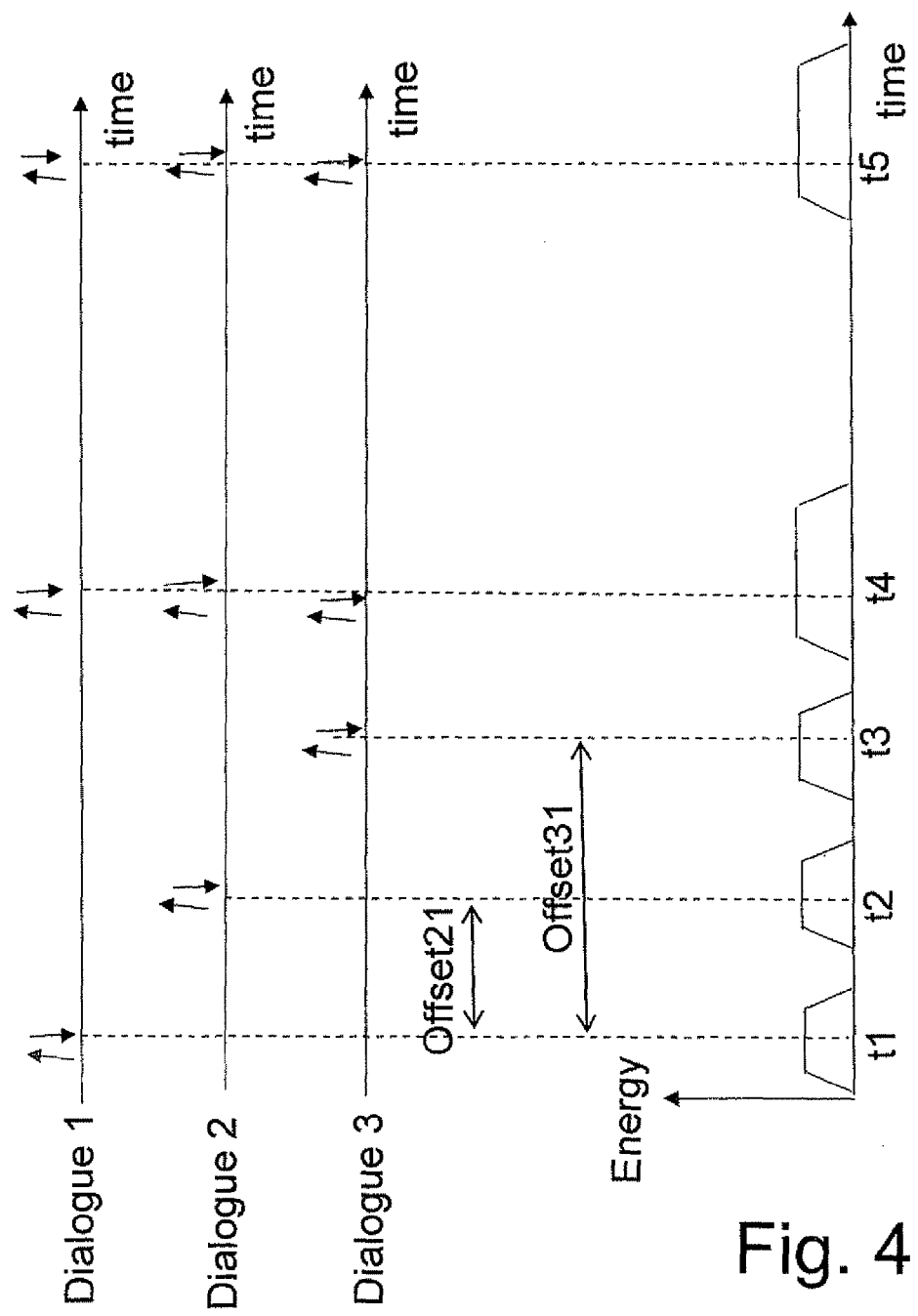
FIG. 4 illustrates the energy consumption of refresh requests of three SIP-dialogues, before and after synchronization.

FIG. 4 illustrates the energy consumption in a client terminal maintaining three SIP-dialogues, before and after synchronization according to this invention. The initial refresh requesting messages in the three dialogues are not correlated in time, and are transmitted on the different time instances t1, t2 and t3, respectively. However, due to the synchronization, according to this invention, the second and third refresh requesting messages from the client terminal to each server terminal will be transmitted on the time instances t4 and t5, respectively, in all of the three dialogues, i.e. the transmission of the refresh requests from the client terminal to the different server terminals have been correlated in time. Since no transition from power-off or low power mode is required between the transmission of the three refresh requesting messages on the time instances t4 and t5, less energy is required, and power is saved compared to when the three refresh requesting messages were transmitted uncorrelated in time, at the time instances t1, t2 and t3, respectively. Thus, the synchronization of the refresh requesting messages from one client terminal to different server terminals, according to this invention, results in power savings and a reduced battery drain of the client terminal.

The synchronization illustrated in FIG. 4 is performed by a synchronizing device 32 (not illustrated in FIG. 4) detecting that the refresh requesting messages are unsynchronized in Dialogue 1, Dialogue 2 and Dialogue 3, i.e. that the refresh requesting messages are not transmitted at least approximately simultaneously from the client terminal. According to a first exemplary embodiment of this invention, a synchronizing device detects that a time offset, larger than a threshold value, occurs between the refresh requests transmitted in Dialogue 2 and Dialogue 1, denoted Offset21 in FIG. 4, and in Dialogue 3 and Dialogue 1, denoted Offset31 in FIG. 4.

Thereafter, the length of the refresh intervals, as indicated by the Session-Expires attributes, in Dialogue 2 and in Dialogue 3 are reduced by the time offsets Offset21 and Offset31, respectively. This reduction can be performed in only one refresh requesting message, or alternatively divided over a few refresh requesting messages. Thereafter, the consecutive refresh requesting messages will be transmitted approximately simultaneously in Dialogue 1, Dialogue 2 and in Dialogue 3. Since the client terminal typically will propose the same, large, refresh interval in the refresh requesting messages transmitted to the different server terminals, the refresh requesting messages will remain synchronized in the three dialogues, i.e. transmitted approximately simultaneously from the client terminal, after the adjustment for the detected time offset.

However, in case the client terminal proposes different refresh intervals in different dialogues, the synchronizing device will detect the difference, and reduce a larger value to correspond to a lower value, such that the refresh intervals will be the same, since otherwise the synchronization will be lost.

Alternatively, if the large value is e.g. 120 and the low value is 50, then the large value could be reduced to 100 instead of 50, i.e. to correspond to a multiple of the lower value. Thereby, the refresh requesting messages will still remain synchronized, but the refresh traffic in this dialogue will be reduced by 50%, which will be power-saving.

According to a second exemplary embodiment, the synchronizing device determines the size of the threshold value, e.g. based on the time interval between the transmission of a refresh requesting message and power-off, and on traffic flow requirements on the network side.

Figure 6:
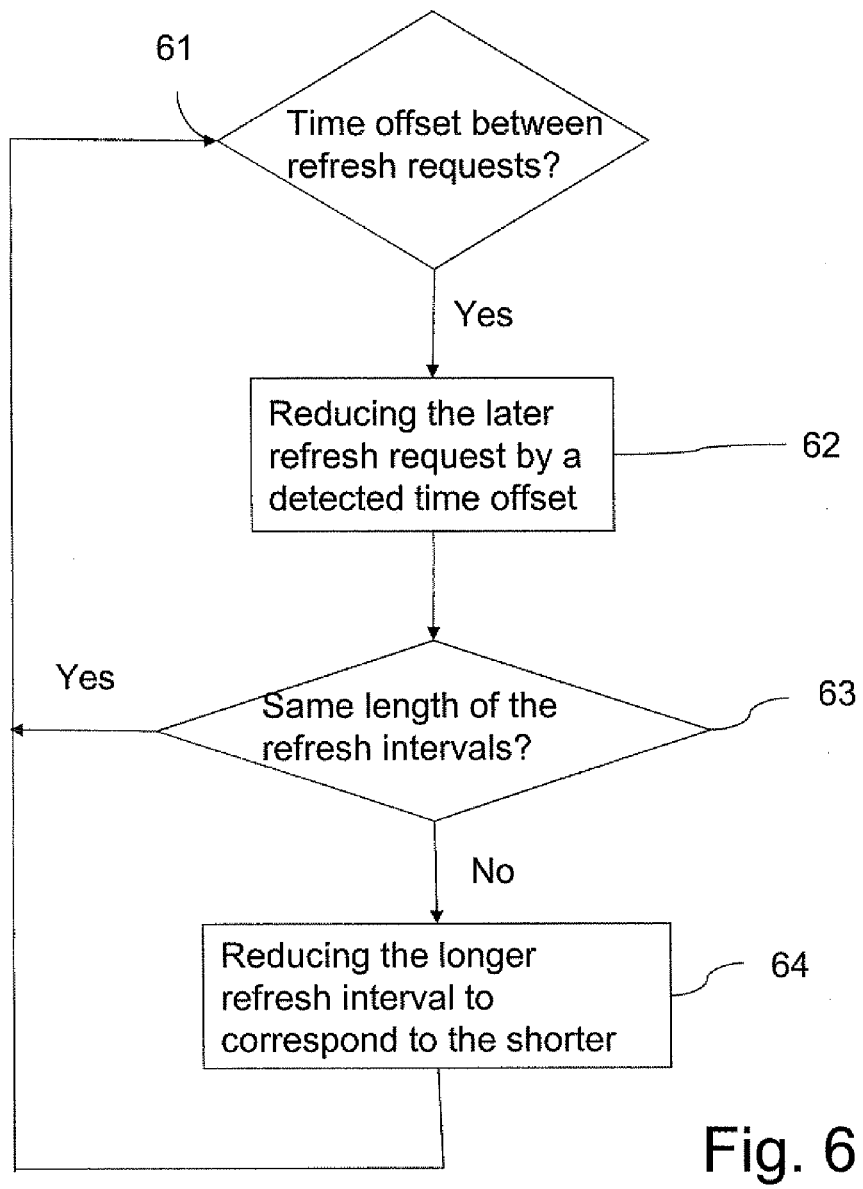
FIG. 6 is a flow diagram illustrating synchronization according to an embodiment of this invention.

FIG. 6 is a flow diagram illustrating the synchronization procedure according to an exemplary embodiment of this invention, in which the refresh requesting messages transmitted from a client terminal to two different server terminals in two dialogues, Dialogue 1 and Dialogue 2, becomes synchronized. In step 61, a synchronizing device continuously determines whether a time offset larger than a threshold value exists between the refresh requests transmitted in Dialogue 2 and Dialogue 1. If such a time offset is detected, then, in step 62, the value of the Session-Expires attribute in the later transmitted refresh requesting message is reduced by the detected time offset. Thereby, the consecutive refresh requesting messages will be transmitted approximately simultaneously in Dialogue 1 and in Dialogue 2. In step 63, it is determined whether Dialogue 1 and Dialogue 2 have the same refresh intervals, and if not, the longer of the two refresh intervals is reduced, in step 64, to correspond to the shorter refresh interval, or to a multiple of the length of the shorter refresh interval, and thereby the refresh requesting messages will remain synchronized.

Figure 5:
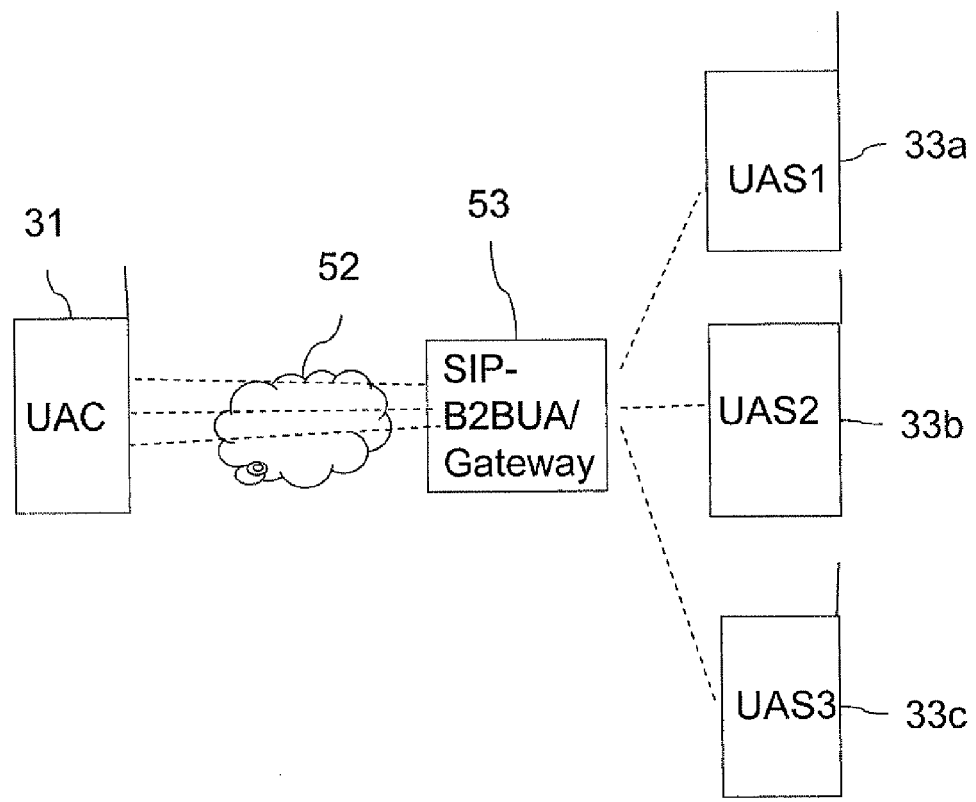
FIG. 5 is a schematic view of a SIP architecture with one User Agent Client and three User Agent Servers.

FIG. 5 illustrates an exemplary SIP architecture comprising one UAC (User Agent Client) 31, i.e. a SIP client terminal, and three UAS 33a, 33b, 33c, i.e. SIP server terminals, the radio network 52, including the radio base stations, and a SIP B2BUA (Back to Back User Agent) 53. The SIP B2BUA functions as a "man in the middle" in each of the three sessions between the UAC and the three UAS, acting as a UAS towards a UAC, and as a UAC towards a UAS.

Thus, according to a first embodiment of the invention, the synchronization of the refresh requesting messages from the client terminal 31 to the three server terminals 33a, 33b, 33c, is performed by a synchronizing device 32 co-located in a SIP B2BUA 53, such as e.g. a border gateway, having a position in which it is able to observe, as well as adjust, the value of the Session-Expires attribute in the session refresh requesting messages or session initiating requesting messages.

By co-locating the synchronization device in a SIP B2BUA, the synchronization functionality may be implemented in all client terminals communicating through the SIP B2BUA.

Thus, an exemplary embodiment of a SIP B2BUA 53 according to this invention comprises a synchronization device 32.

However, the client terminal 31 itself is also able to observe and adjust the value of the refresh interval, as indicated by a Session-Expires attribute, in a session initiation requesting message and the session refresh requesting messages and transmitted to the server terminals 33a, 33b and 33c, as well as detecting a time offset between the refresh requesting messages transmitted from the terminal in the different dialogues. Thus, according to a second embodiment of this invention, the synchronization of the refresh requesting messages from the client terminal 31 to the three server terminals 33a, 33b, 33c, is performed by a synchronizing device 32 located in the client terminal itself.

Thus, a first embodiment of a client terminal 31 according to this invention comprises a synchronization device 32. However, according to a second embodiment, a client terminal 31 according to this invention is further arranged to correlate the refresh traffic with other traffic, by transmitting a scheduled refresh requesting message immediately after the transmission of other traffic, before the expiry of the refresh interval. Thereby, an increased power saving is achieved.

Figure 7:
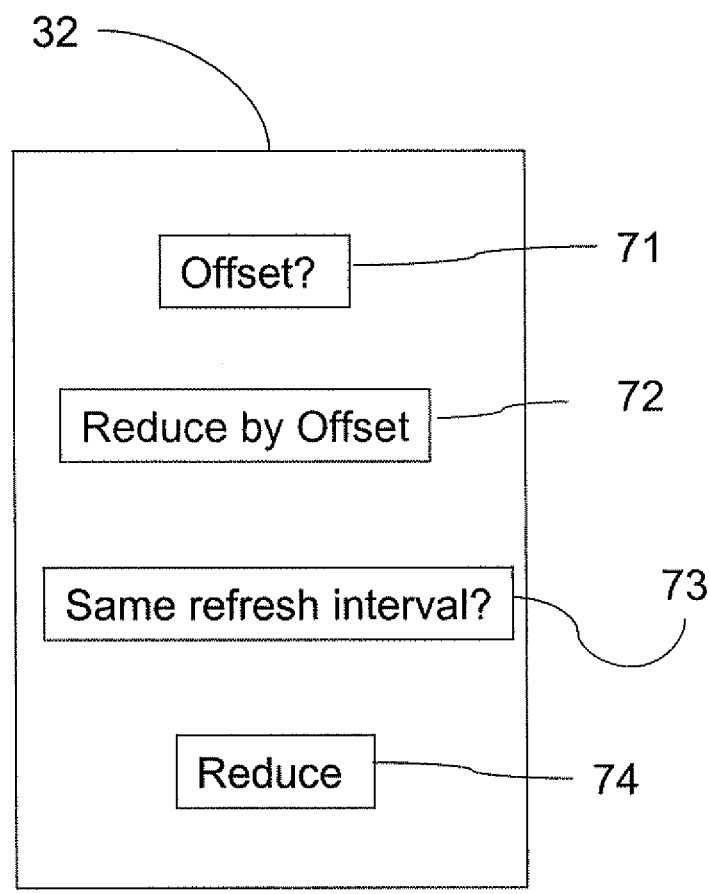
FIG. 7 is a block diagram illustrating a synchronizing device according to an embodiment of this invention.

FIG. 7 is a block diagram illustrating an exemplary synchronizing device 32, according to a first embodiment of this invention, applicable to a SIP-dialogue. The synchronizing device 32 comprises means 71 for detecting the occurrence of a time offset larger than a threshold between the refresh requests transmitted in a first and a second SIP-Dialogue maintained by one client terminal, i.e. a UAC. Further, the device comprises means 72 to reduce the length of the refresh interval of the later of the refresh requesting messages by the detected time offset. The synchronizing device further comprises means 73 for determining whether the length of the refresh intervals indicated in the consecutive refresh requesting messages of the two dialogues are the same, and means 74 for reducing the length of the longer refresh interval to correspond to the length of the shorter refresh interval, or to a multiple of the length of the shorter refresh interval, if the refresh intervals are not the same.

According to a second embodiment, the synchronizing device further comprises means for determining the size of said threshold value.

This invention is applicable to any soft-state signalling protocol comprising session refresh requesting messages, such as e.g. the INVITE or UPDATE-messages in SIP, and it is advantageous e.g. in IMS, since an IMS client terminal often maintains multiple dialogues.

While the invention has been described with reference to specific exemplary embodiments, the description is in general only intended to illustrate the inventive concept and should not be taken as limiting the scope of the invention.

The invention claimed is:

1. A method implemented by a synchronizing device for synchronizing refresh-requesting messages transmitted from a client terminal across multiple, simultaneous soft-state dialogues, the method comprising:
   continuously detecting whether a time offset larger than an adjustable threshold value exists between refresh-requesting messages for different soft-state dialogues,
   when a time offset larger than the adjustable threshold value is detected,
      reducing the length of a refresh interval indicated in at least one later refresh-requesting message by said detected time offset;
      after the reduction, comparing lengths of the refresh intervals indicated in subsequent refresh-requesting messages for the different dialogues, and
      if the refresh intervals have different lengths, adjusting the length of a longer one of those refresh intervals by reducing that longer length of the refresh interval indicated in the corresponding refresh-requesting message to correspond either to the length of a shorter one of the refresh intervals, or to a multiple of the length of the shorter refresh interval.

2. The method according to claim 1, wherein said refresh-requesting messages comprise at least one of session initiation-requesting messages and session refresh-requesting messages.

3. The method according to claim 1, wherein said reducing comprises reducing the refresh interval in only one later refresh-requesting message, by said detected time offset.

4. The method according to claim 1, wherein said reducing comprises reducing the refresh intervals indicated in two or more later refresh-requesting messages of a same soft-state dialogue, dividing the reduction by said detected time offset over those two or more refresh-requesting messages.

5. The method according to claim 1, wherein the synchronizing device is located in the client terminal.

6. The method according to claim 1, wherein the dialogues are Session Initiation Protocol (SIP) dialogues.

7. The method according to claim 6, wherein the client terminal is a SIP User Agent.

8. The method according to claim 7, wherein the client terminal is distributed between more than one implementation device, each device hosting a SIP User Agent Client.

9. The method according to claim 6, wherein the synchronizing device is co-located with a SIP Back to Back User Agent (B2BUA), through which the refresh-requesting messages pass.

10. The method according to claim 9, wherein the SIP B2BUA is a border gateway.

11. The method according to claim 6, wherein the refresh interval in a refresh-requesting message is indicated by a Session-Expires attribute attached to a header.

12. A synchronizing device configured to synchronize refresh-requesting messages transmitted from a client terminal across multiple soft-state dialogues, wherein the synchronizing device is configured to:
   continuously detect whether a time offset larger than an adjustable threshold value exists between refresh-requesting messages for different soft-state dialogues,
   when a time offset larger than the adjustable threshold value is detected,
      reduce the length of a refresh interval indicated in at least one later refresh-requesting message by said detected time offset;
      after the reduction, compare lengths of the refresh intervals indicated in subsequent refresh-requesting messages for the different dialogues, and
      if the refresh intervals have different lengths, adjust the length of a longer one of those refresh intervals by reducing that longer length of the refresh interval indicated in the corresponding refresh-requesting message to correspond either to the length of a shorter one of the refresh intervals, or to a multiple of the length of the shorter refresh interval.

13. The synchronizing device according to claim 12, wherein the refresh-requesting messages comprise at least one of session initiation-requesting messages and session refresh-requesting messages.

14. The synchronizing device according to claim 12, wherein the synchronizing device is located in a client terminal.

15. The synchronizing device according to claim 12, wherein the synchronizing device is configured to synchronize refresh-requesting messages transmitted in multiple Session Initiation Protocol (SIP) dialogues.

16. The synchronizing device according to claim 15, wherein the client terminal is a SIP User Agent.

17. The synchronizing device according to claim 15, wherein the client terminal is distributed between more than one implementation device, each device hosting a SIP User Agent Client.

18. The synchronizing device according to claim 15, wherein the refresh interval in a refresh-requesting message is indicated by a Session-Expires attribute attached to a header.

19. The synchronizing device according to claim 15, wherein the synchronizing device is co-located with a SIP Back to Back User Agent (B2BUA), through which refresh-requesting messages pass.

20. A synchronizing device according to claim 19, wherein the SIP B2BUA is a border gateway.

21. A client terminal comprising a synchronizing device, wherein the synchronizing device is configured to synchronize refresh-requesting messages transmitted from the client terminal across multiple soft-state dialogues, wherein the synchronizing device is configured to:
   continuously detect whether a time offset larger than an adjustable threshold value exists between refresh-requesting messages for different soft-state dialogues,
   when a time offset larger than the adjustable threshold value is detected, reduce the length of a refresh interval indicated in at least one later refresh-requesting message by said detected time offset;

after the reduction, compare lengths of the refresh intervals indicated in subsequent refresh-requesting messages for the different dialogues, and if the refresh intervals have different lengths, adjust the length of a longer one of those refresh intervals by reducing that longer length of the refresh interval indicated in the corresponding refresh-requesting message to correspond either to the length of a shorter one of the refresh intervals, or to a multiple of the length of the shorter refresh interval; and wherein the client terminal is configured to correlate the refresh-requesting messages with other traffic, by transmitting a scheduled refresh-requesting message immediately after the transmission of other traffic, before the expiration of a refresh interval.

22. The method of claim 1, wherein the refresh interval in any refresh-requesting message is indicated by a Session-Expires attribute attached to a header in the refresh-requesting message, and wherein the reducing of a refresh interval indicated in at least one later refresh-requesting message by said detected time offset comprises reducing a Session-Expires attribute attached to the header in the at least one later refresh requesting message by said detected time offset.

23. The method of claim 1, further comprising:

receiving the refresh-requesting messages for the multiple soft-state dialogues; and forwarding the refresh-requesting messages to respective servers associated with the multiple soft-state dialogues;

wherein said forwarding comprises, if the synchronizing device has reduced the refresh interval indicated in a refresh-requesting message, forwarding the refresh-requesting message with the reduced refresh interval.

* * * * *